Patented June 24, 1941

2,246,666

UNITED STATES PATENT OFFICE 2,246,666

PROCESS FOR STORING SULPHUR

Charles S. Collier, Wilmington, Del., and Lee A. Myers, Chicago, Ill., assignors to E. I. du Pont de Nemours & Company, Wilmington, Del., a corporation of Delaware No Drawing. Application December 27, 1939, Serial No. 311,086

2 Claims. (Cl. 23—242)

This invention relates to the storing of brimstone and is more particularly directed to the protection and conservation of a pile of sulphur by the provision of a continuous coating of solidified sulphur.

Sulphur for use in the manufacture of sulphuric acid and in other chemical processes is ordinarily stored in large piles in the open and large chemical plants usually maintain a relatively large surplus of this important raw material. The high investment costs prevent the storing of sulphur in buildings or in storage bins. Storing sulphur in the open requires a minimum of investment and involves a minimum of handling since the sulphur can easily be unloaded directly to the pile from flat cars or barges and can easily be used when needed by the employment of a suitable crane or other mechanical handling device.

Storing sulphur in the open has the disadvantage that some of the sulphur is lost through wind and rain erosion. The sulphur or so-called brimstone of commerce is offered to the trade in divided form, the discrete particles of sulphur varying in size from chunks several inches in each dimension to very fine particles which make up an almost impalpable powder. The bulk of the sulphur is rather finely divided and wind or rain blows or washes away considerable amounts of sulphur from storage piles. The yearly loss from brimstone piles varies from about one to three per cent of the total sulphur, depending upon the location. In very windy areas or in places with an unusually heavy rainfall the sulphur losses become a very serious item of expense.

The storage of sulphur in the open in unprotected piles has the still further disadvantage that the sulphur becomes contaminated with cinders and other wind-blown foreign materials. The sulphur pile presents a relatively rough surface and cinders and the like are caught and retained. The presence of such foreign material is of course undesirable and this is particularly true if cinders containing a high proportion of chlorides or arsenic are blown onto the piles since even traces of these materials will poison catalysts if the sulphur is later used for the manufacture of sulphuric acid.

It is an object of this invention to provide processes for storing sulphur without losses from wind and rain. It is a further object of this invention to provide processes for storing sulphur without substantial loss and without the use of storage buildings or equipment. It is a still further object of this invention to provide processes and sulphur storage involving the use of no added or foreign material which would contaminate the sulphur. It is a further object of this invention to provide a sulphur pile with means for preventing losses thru the action of wind and rain and for protecting the pile from cinders and other wind-blown foreign materials. Other objects of the invention will become apparent hereinafter.

The foregoing and other objects of our invention are attained by storing sulphur in a pile and providing on the pile a continuous coating of solidified sulphur. A coating of solidified sulphur can be provided on a pile of finely divided sulphur in a number of ways as, for instance, by raking the surface of the pile by an electrically heated rake or by applying heat to the surface of the pile with other types of heated devices, or by directing a reducing flame upon the pile. Alternatively, molten sulphur may be sprayed or simply poured upon the surface of the pile.

The use of heated rakes or heated devices of various sorts involves a great deal of labor and rather complicated special equipment. The use of a reducing flame is attended by the difficulty that sulphur is very readily ignited and considerable care must be taken to prevent the pile of sulphur catching fire. The use of a spray of molten sulphur is somewhat disadvantageous because of the rather complicated equipment required but is otherwise rather satisfactory.

While any of the foregoing and other ways of applying sulphur may be employed according to the present invention, it is preferred to apply separately melted molten sulphur by means of ladles.

According to the preferred procedure the ridge of a pile of sulphur is leveled off so that the pile will be fairly flat on top and then the sides of the pile are smoothed with a suitable rake. Workmen then go to the top of the pile and working on the flat space melt sulphur in an externally fired receptacle. Molten sulphur is then applied to the top and sides by manually pouring it with ladles. In this way a solidified cover extending about half-way down the pile is quickly and evenly applied. The solidified cover can readily be built up by successive applications to a thickness varying from about a quarter to one-half inch.

After the top portion of the pile is coated the workmen may then work at the base of the pile and throw molten sulphur up the sides to complete the coating.

It will be seen that the final pile produced has a coating extending over most of the exposed surface. The pile is of course divided sulphur and the coating in contradistinction to the divided character of the original sulphur is solidified to form a continuous instead of a discontinuous body of sulphur.

A pile of sulphur provided with a continuous sulphur coating over most of its external area will lose substantially no sulphur by reason of wind and rain erosion. The covering applied to a pile of sulphur according to the present invention has been found to be sufficiently durable to withstand the elements for at least a year.

It will be understood that the processes here described are illustrative and that one skilled in the art without departing from the spirit of this invention may readily protect piles of sulphur in numerous ways involving the provision of a coating of solidified sulphur on the outside of the pile.

We claim:

1. In a process for storing sulphur, the step comprising providing molten sulphur on the surface of a pile of finely divided sulphur and permitting the molten sulphur to solidify and form a coating on the pile.

2. In a process for storing sulphur, the step comprising applying molten sulphur to the surface of a pile of finely divided sulphur and permitting the melted sulphur to solidify and form a coating on the outside of said pile.

CHARLES S. COLLIER.
LEE A. MYERS.